US012783133B2

(12) United States Patent
Shin et al.

(10) Patent No.: US 12,783,133 B2
(45) Date of Patent: Nov. 3, 2026

(54) MEMORY CONTROLLER, MEMORY SYSTEM, AND OPERATING METHOD THEREOF

(71) Applicant: Samsung Electronics Co., Ltd., Suwon-si (KR)

(72) Inventors: Dongeun Shin, Suwon-si (KR); Kihwan Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/033,726

(22) Filed: Jan. 22, 2025

(65) Prior Publication Data

US 2026/0050383 A1 Feb. 19, 2026

(30) Foreign Application Priority Data

Aug. 14, 2024 (KR) ........................ 10-2024-0108992

(51) Int. Cl.
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 7,679,133 B2 3/2010 Son et al.
8,553,466 B2 10/2013 Han et al.
8,559,235 B2 10/2013 Yoon et al.
8,654,587 B2 2/2014 Yoon et al.
(Continued)

FOREIGN PATENT DOCUMENTS

KR 20190056211 A 5/2019

OTHER PUBLICATIONS

Cai et al., Read Disturb Errors in MLC NAND Flash Memory. arXivp preprint, arXiv:1805.03283. May 8, 2018. 12 pages.—item cited as second non-patent literature document on IDS dated Oct. 2, 2025 (Year: 2018).*
(Continued)

*Primary Examiner* — Daniel C. Chappell
(74) *Attorney, Agent, or Firm* — Wolf, Greenfield & Sacks, P.C.

(57) ABSTRACT

Provided is a memory system. The memory system may include a non-volatile memory device including a memory cell array that includes a plurality of blocks, and a memory controller electrically connected to the non-volatile memory device and configured to control the non-volatile memory device. The memory controller may be configured to determine a retention vulnerability and a disturb vulnerability for each of the plurality of blocks, determine data characteristics of target data for reclamation, select a destination block for moving the target data based on the data characteristics and at least one of the retention vulnerability or the disturb vulnerability, and control the non-volatile memory device to move the target data to the destination block.

15 Claims, 18 Drawing Sheets

(58) Field of Classification Search

CPC ... G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094; H04L 61/00–59; H04L 67/00–75; H10W 90/00–811; H10W 95/00; H10W 99/00

See application file for complete search history.

(56) References Cited

U.S. PATENT DOCUMENTS

| | | | | |
|---|---|---|---|---|
| 9,171,620 | B2 | 10/2015 | Avila et al. | |
| 9,711,234 | B1 | 7/2017 | Van Gaasbeck | |
| 9,904,479 | B1 * | 2/2018 | Chen | G06F 3/065 |
| 10,014,060 | B2 | 7/2018 | Tuers et al. | |
| 10,310,924 | B2 | 6/2019 | Jei et al. | |
| 10,671,287 | B2 | 6/2020 | Doh et al. | |
| 11,237,742 | B2 | 2/2022 | Lee | |
| 2011/0233648 | A1 | 9/2011 | Seol et al. | |
| 2015/0301756 | A1 * | 10/2015 | Fang | G11C 8/10 711/103 |
| 2016/0179428 | A1 * | 6/2016 | Parker | G11C 16/12 711/103 |
| 2023/0036841 | A1 * | 2/2023 | Kim | G06F 3/0631 |

OTHER PUBLICATIONS

Extended European Search Report for European Application No. 25165696.3, dated Jul. 29, 2025.

Cai et al., Read Disturb Errors in MLC NAND Flash Memory. arXivp preprint, arXiv:1805.03283. May 8, 2018. 12 pages.

Luo, Architectural Techniques for Improving NANO Flash Memory Reliability. arXiv preprint, arXiv:1808.04016. Aug. 12, 2018. 263 pages.

* cited by examiner

MEMORY CONTROLLER, MEMORY SYSTEM, AND OPERATING METHOD THEREOF

CROSS-REFERENCE TO RELATED APPLICATIONS

This application claims priority to Korean Patent Application No. 10-2024-0108992, filed in the Korean Intellectual Property Office on Aug. 14, 2024, the entire contents of which are hereby incorporated by reference.

BACKGROUND OF THE INVENTION

The present disclosure relates to a memory controller, a memory system, and an operating method thereof.

Non-volatile memory devices are widely used in various electronic devices and systems for their ability to retain stored data even when power is cut off. However, even in these non-volatile memories, data may be lost or corrupted due to various factors. For example, data may be distorted or lost as the charge of a memory cell decreases over time, data may be corrupted due to interference between adjacent cells, and data may be deformed as the memory cell deteriorates due to repeated write/read operations, etc.

Data corruption in the memory device may cause malfunctions of the electronic device or loss of important information, which may seriously reduce the reliability of the memory system. To prevent this, the memory system may perform various background operations to ensure data integrity, but performing these background operations can consume considerable power.

SUMMARY OF THE INVENTION

In order to solve one or more problems (e.g., the problems described above and/or other problems not explicitly described herein), the present disclosure provides a memory controller and memory system, and an operating method thereof.

The problems to be solved by the present disclosure are not limited to those described above, and other problems not mentioned will be clearly understood by those skilled in the art from the description below.

According to some aspects of the present disclosure, a memory system may include a non-volatile memory device comprising a memory cell array that includes a plurality of blocks, and a memory controller electrically connected to the non-volatile memory device and configured to control the non-volatile memory device. The memory controller may be configured to determine a retention vulnerability and a disturb vulnerability for each of the plurality of blocks, determine data characteristics of target data for reclamation, select a destination block for moving the target data based on the data characteristics and at least one of the retention vulnerability or the disturb vulnerability, and control the non-volatile memory device to move the target data to the destination block.

According to some aspects of the present disclosure, a memory controller configured to control a memory device including a plurality of blocks may include a working memory configured to store one or more instructions, and at least one processor electrically connected to the working memory. In response to executing the one or more instructions stored in the working memory, the at least one processor may be configured to control the memory device to determine a retention vulnerability and a disturb vulnerability for each of the plurality of blocks, determine data characteristics of target data for reclamation, select a destination block for moving the target data based on the data characteristics and at least one of the retention vulnerability or the disturb vulnerability, and move the target data to the destination block.

According to some aspects of the present disclosure, an operating method of a memory controller configured to control a memory device including a plurality of blocks may include determining a retention vulnerability and a disturb vulnerability for each of the plurality of blocks, determining data characteristics of target data for reclamation, selecting a destination block for moving the target data based on the data characteristics and at least one of the retention vulnerability or the disturb vulnerability, and controlling the memory device to move the target data to the destination block.

According to some aspects of the present disclosure, an appropriate destination block suitable for the data characteristics of the target data requiring reclamation may be selected, and by performing the reclaim operation accordingly, the errors and/or the possibility of error occurrence in the memory device can be reduced and the reliability of the memory device can be improved.

According to some aspects of the present disclosure, as the errors and/or the possibility of error occurrence is reduced, resources required for various background operations for maintaining data integrity can be saved.

The effects of the present disclosure are not limited to those described above. Technical effects not explicitly described herein will be clearly understood by those skilled in the art from the description below.

BRIEF DESCRIPTION OF THE DRAWINGS

The above and other objects, features and advantages of the present disclosure will become more apparent to those of ordinary skill in the art by describing in detail example embodiments thereof with reference to the accompanying drawings, in which.

DETAILED DESCRIPTION

Figure 1:
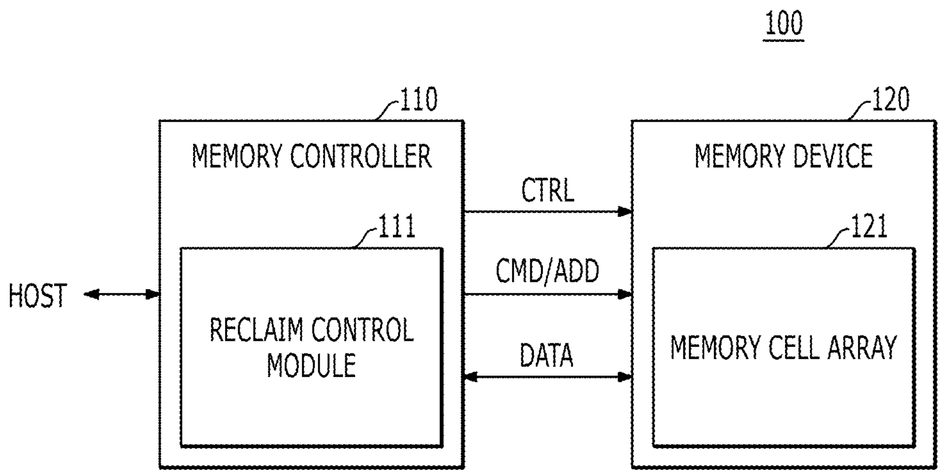
FIG. 1 is a block diagram illustrating an example of a memory system.

Various aspects of the present disclosure will be described with reference to FIGS. 1 to 18. Throughout the description, the same reference numerals may refer to the same components.

FIG. 1 is a block diagram illustrating an example of a memory system 100.

Referring to FIG. 1, the memory system 100 may include a memory controller 110 and a memory device 120, and the memory device 120 may include a memory cell array 121. Although not illustrated in FIG. 1, the memory device 120 may further include various peripheral circuits (e.g., a row decoder 340, a voltage generation unit 330, a control logic 320, etc., which will be described below with reference to FIG. 3) for controlling write/read/erase operations of memory cells included in the memory cell array 121.

The memory system 100 may communicate with a host HOST through various interfaces. For example, the memory system 100 may communicate with the host HOST through various interfaces such as Universal Serial Bus (USB), multimedia card (MMC), embedded MMC (eMMC), Peripheral Component Interconnection (PCI), PCI-express (PCI-E), Advanced Technology Attachment (ATA), Serial-ATA, Parallel-ATA, small computer small interface (SCSI), enhanced small disk interface (ESDI), Integrated Drive Electronics (IDE), Firewire, Universal Flash Storage (UFS), Non-Volatile Memory express (NVMe), etc.

The memory device 120 may include a non-volatile memory device such as a flash memory. In some embodiments, the memory system 100 may be implemented as a memory embedded in or removable from the electronic device, and for example, the memory system 100 may be implemented in various forms such as a Universal Flash Storage (UFS) memory device, an embedded Multi-Media Card (eMMC), a Solid State Drive (SSD), a UFS memory card, a Compact Flash (CF), a Secure Digital (SD), a Micro Secure Digital (Micro-SD), a Mini Secure Digital (Mini-SD), an extreme Digital (xD), a Memory Stick, etc. In some embodiments, the memory system 100 may be referred to as a storage device.

According to some embodiments, the memory device 120 may include a plurality of flash memory chips. The memory controller 110 may communicate with the memory device 120 through one or more channels. In some embodiments in which the memory device 120 includes a plurality of flash memory chips, the memory cell array 121 may include memory cell array(s) included in one or more flash memory chips.

The memory controller 110 may control the memory device 120 to read data stored in the memory device 120 or to write data to the memory device 120 in response to a write/read request from the host HOST. For example, the memory controller 110 may provide a command/address CMD/ADD and a control signal CTRL to the memory device 120 to control write, read, and erase operations of the memory device 120. In addition, data DATA to be stored in the memory device 120 and data DATA read from the memory device 120 may be transmitted and received between the memory controller 110 and the memory device 120.

The memory cell array 121 may include a plurality of memory cells. For example, each of the plurality of memory cells may be a flash memory cell. Hereinafter, embodiments of the present disclosure will be described in detail with reference to an example in which each of the plurality of memory cells is a NAND flash memory cell. However, the present disclosure is not limited thereto. For example, in some embodiments, each of the plurality of memory cells may be a resistive memory cell such as resistive RAM (ReRAM), phase change RAM (PRAM), or magnetic RAM (MRAM).

The memory controller 110 may include a Flash Translation Layer (FTL). The FTL may include instructions for performing management of write, read, and erase operations of the memory device 120, for example, and may be loaded into a working memory in the memory controller 110. The instructions included in the FTL may be executed by a processor (not illustrated) included in the memory controller 110.

The memory controller 110 may control various operations of the memory device 120 based on the execution of the FTL. For example, in response to a request for data access from the host HOST, the memory controller 110 may translate a logical address from the host HOST into a physical address and provide the result to the memory device 120. In addition, the FTL may perform management operations for various cell areas (e.g., chip units, block units, page units, etc.) provided in the memory cell array 121.

The memory controller 110 may perform and/or control various background operations to maintain the integrity of data stored in the memory device 120. For example, the memory controller 110 may monitor corruption and/or the possibility of corruption of the data stored in the memory cell array 121 by executing various algorithms (e.g., Random Interval Neighbor Check (RINC) algorithms, Patrol Read, Background Media Scan, etc.). If determining a possibility of corruption of specific data stored in a specific block during monitoring, the memory controller 110 may trigger a reclaim operation for the corresponding data.

The reclaim operation may include an operation of moving the data stored in the specific block (source block) to one or more other blocks (destination blocks). For example, the reclaim operation may include moving data stored in a specific block to one or more other blocks, if it is determined that the data stored in the specific block is likely to be corrupted.

The memory controller 110 may include a reclaim control module 111. The reclaim control module 111 may perform and/or control the reclaim operation and/or operations related thereto. For example, in response to triggering reclamation, the reclaim control module 111 may perform and/or control reclaim operation for the target data requiring reclamation. The reclaim control module 111 may determine data characteristics of the target data requiring reclamation, and select an appropriate destination block based on the determined data characteristics. This will be described in more detail below with reference to FIGS. 7 to 18.

The function of the reclaim control module 111 may be implemented in a hardware circuit, or software, or may be implemented based on a combination of hardware and software. For example, if the reclaim control module 111 is implemented in software, the software that performs the function of the reclaim control module 111 may be stored in the memory controller 110. As a specific example, instructions for performing functions of the reclaim control module 111 may be included in the FTL.

Figure 2:
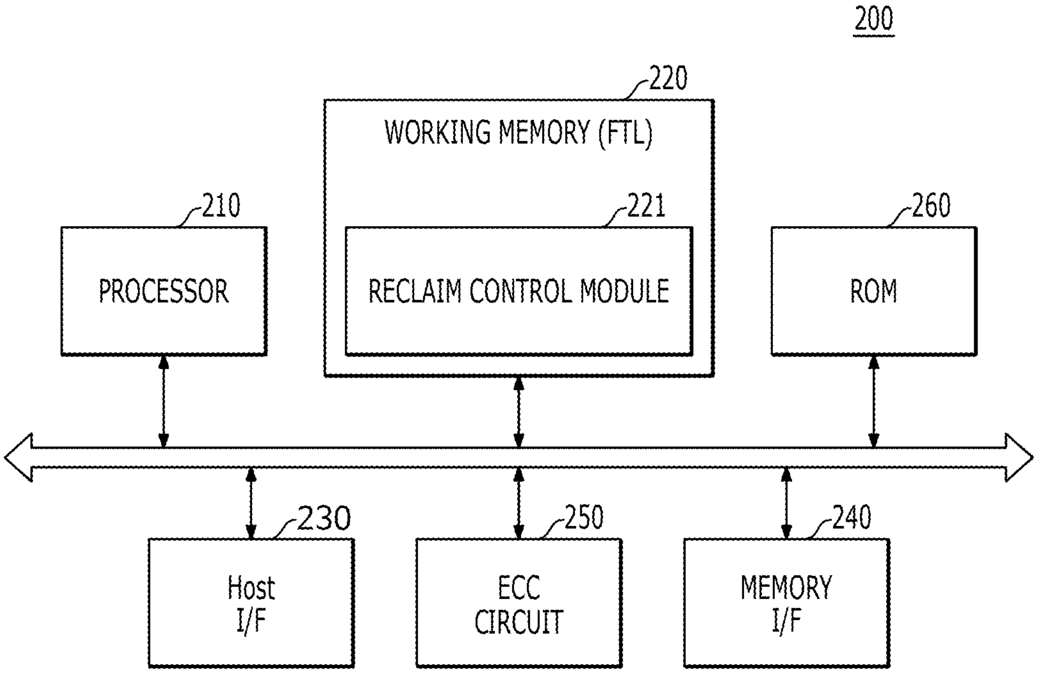
FIG. 2 is a block diagram illustrating an example of a memory controller.

FIG. 2 is a block diagram illustrating an example of a memory controller 200.

Referring to FIG. 2, the memory controller 200 may include a processor 210, a working memory 220, a host interface 230, a memory interface 240, an Error Correction Code (ECC) circuit 250, and a Read Only Memory (ROM) 260. The memory controller 200 may correspond to the memory controller 110 of FIG. 1.

The processor 210 may control the overall operations of the memory controller 200. For example, the processor 210 may execute firmware (or instructions included therein) loaded into the working memory 220 to control the overall operation of the memory controller 200. The working memory 220 may include various types of memories, and may include, for example, volatile memories such as cache memories, DRAMs, SRAMs, etc. In addition, as an example of firmware, the FTL may be loaded into the working memory 220, and various functions related to flash memory operations may be performed as various modules included in the FTL are executed. For example, the working memory 220 may store the firmware (and/or instructions included therein). Meanwhile, the ROM 260 may store code data that is used for initial booting of the device employing the memory system.

The host interface 230 may communicate with the host through various types of interfaces. In addition, the memory interface 240 may provide a physical connection between the memory controller 200 and the memory device. For example, command/address, data, etc. may be transmitted and received between the memory controller 200 and the memory device through the memory interface 240. In addition, the ECC circuit 250 may perform ECC encoding on the data requested for writing, and may perform ECC decoding on the read data.

The working memory 220 may store various modules each including firmware, and may store a reclaim control module 221, for example. The reclaim control module 221 may correspond to, for example, the reclaim control module 111 of FIG. 1. The reclaim control module 221 may perform and/or control the reclaim operation and/or operations related thereto. For example, in response to triggering reclamation, the reclaim control module 221 may perform and/or control the reclaim operation for the target data requiring reclamation. The reclaim control module 221 may determine data characteristics of the target data requiring reclamation, and select an appropriate destination block based on the determined data characteristics. This will be described in more detail below with reference to FIGS. 7 to 18.

Figure 3:
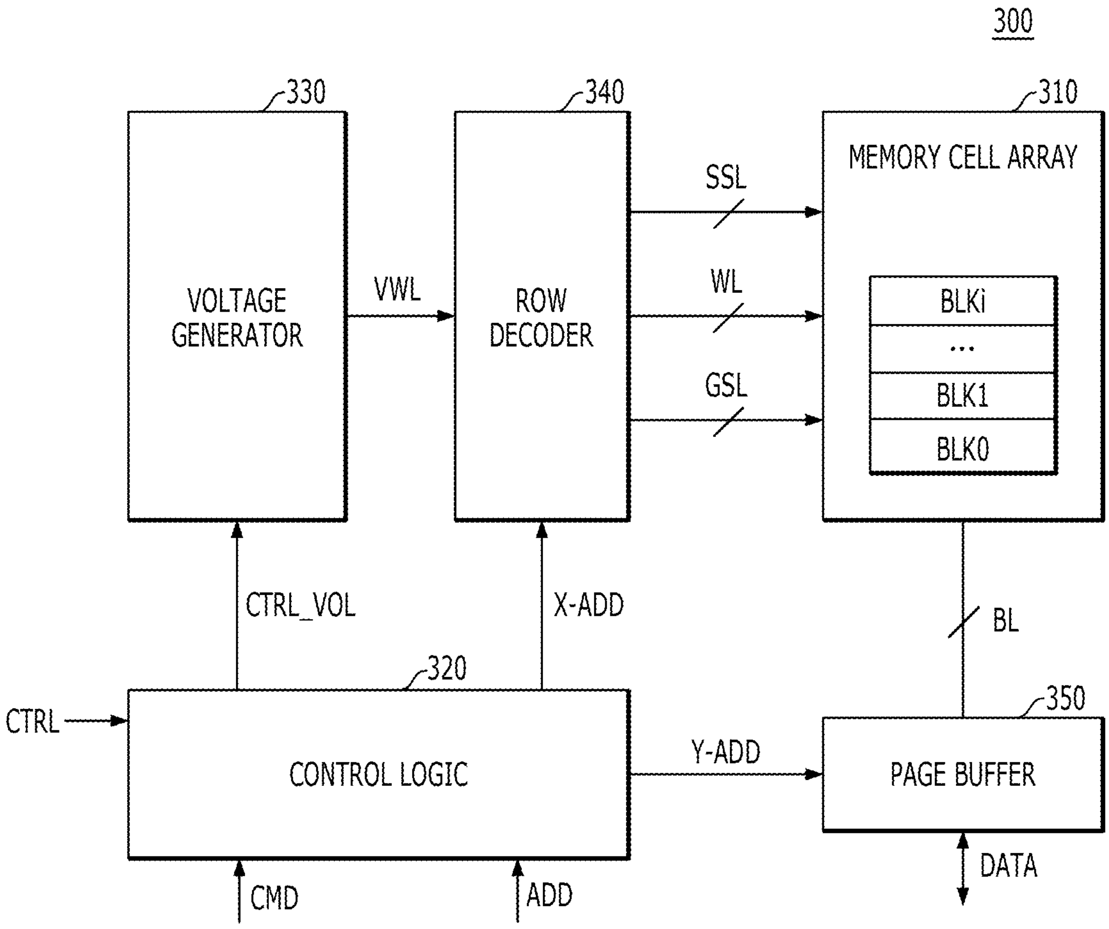
FIG. 3 is a block diagram illustrating an example of a memory device.

FIG. 3 is a block diagram illustrating an example of a memory device 300.

Referring to FIG. 3, the memory device 300 may include a memory cell array 310, the control logic 320, the voltage generation unit 330, the row decoder 340, and a page buffer 350. The memory device 300 may correspond to, for example, the memory device 120 of FIG. 1. Although not illustrated, the memory device 300 may further include various other components such as data input/output circuit, input/output interface, etc. that are related to the memory operation.

The memory cell array 310 may include a plurality of memory cells, and may be connected to word lines WL, string selection lines SSL, ground selection lines GSL, and bit lines BL. For example, the memory cell array 310 may be connected to the row decoder 340 through the word lines WL, the string selection lines SSL, and the ground selection lines GSL, and may be connected to the page buffer 350 through the bit lines BL. Each of the plurality of memory cells may store one or more bits. For example, the memory device 300 may be a device designed such that each memory cell stores data of a predetermined number of bits. The predetermined number of bits may be 1 bit (e.g., SLC) or 1 bit or more (e.g., MLC, TLC, QLC, or more). For example, the predetermined number of bits may be 4 bits or more (i.e., may be at least 4 bits).

The memory cell array 310 may include a two-dimensional (2D) memory cell array. The 2D memory cell array may include a plurality of cell strings arranged in a row direction and a column direction. Additionally or alternatively, the memory cell array 310 may include a three-dimensional (3D) memory cell array. The 3D memory cell array may include a plurality of cell strings, and each cell string may include memory cells respectively connected to the word lines WL stacked vertically on the substrate. U.S. Pat. Nos. 7,679,133, 8,553,466, 8,654,587, and 8,559,235, and U.S. Patent Application Publication No. 2011/0233648 hereby incorporated herein by reference in their entirety describe a 3D memory cell array formed of multiple levels and in which word lines and/or bit lines are shared between the levels.

The memory cell array 310 may include a plurality of blocks BLK0, BLK1, . . . , BLKi. In addition, each of the plurality of blocks BLK0, BLK1, . . . , BLKi may include a plurality of cell strings, and each of the plurality of cell strings may be connected to the word lines WL. In addition, a plurality of memory cells may be connected to each of the word lines WL, and each of the plurality of memory cells may store data in units of 1 bit or more (e.g., 4 bits of data, etc.).

The control logic 320 may output various control signals for writing data to the memory cell array 310 or reading data from the memory cell array 310, based on the command CMD, the address ADD, and the control signal CTRL received from the memory controller. Based on the received address ADD, the control logic 320 may provide a row address X-ADD to the row decoder 340, and provide a column address Y-ADD to the page buffer 350. In addition, the voltage generation unit 330 may generate various voltages for use in the memory device 300, and for example, may provide word line voltages VWL having various levels in relation to the write, read, and erase operations. The control logic 320 may output the voltage control signal CTRL_vol for controlling the level of the word line voltage VWL generated from the voltage generation unit 330.

Figure 4:
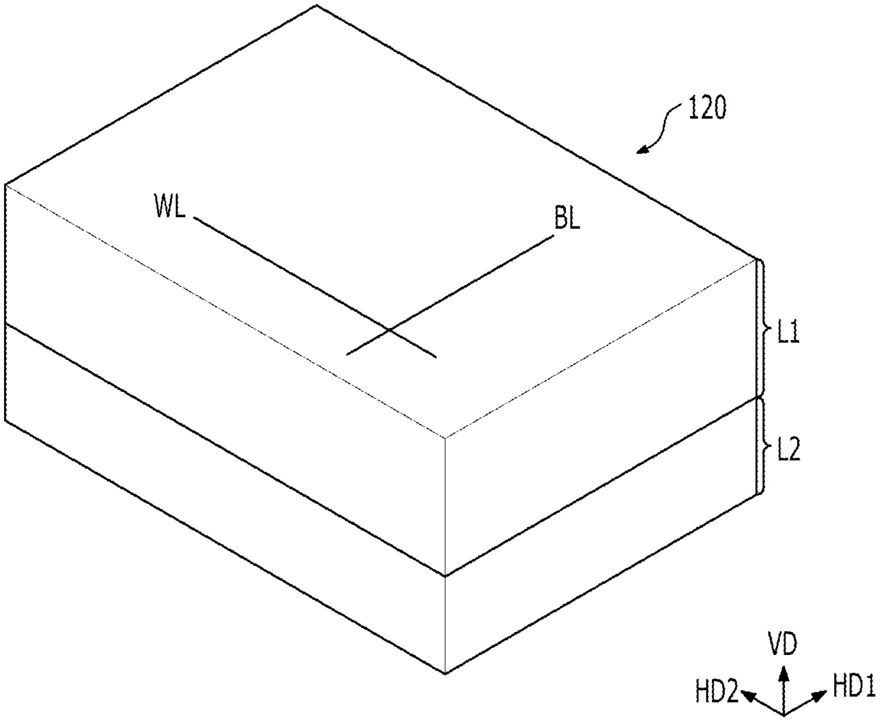
FIG. 4 is a schematic diagram illustrating an example of a structure of a memory device.
Figure 5:
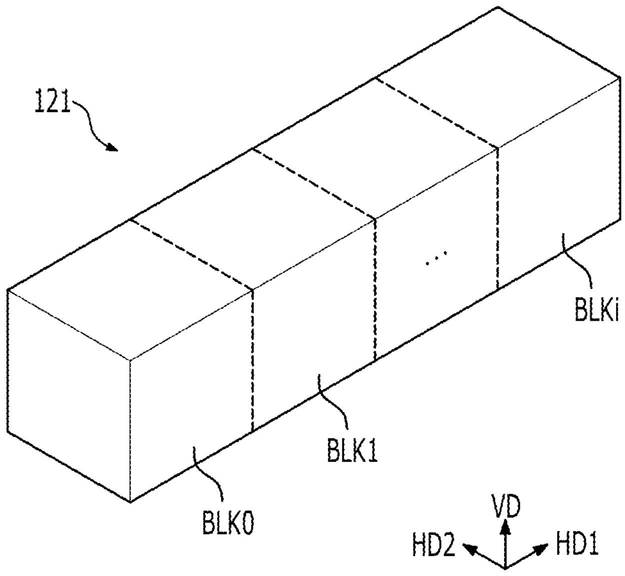
FIG. 5 is a diagram illustrating an example of a memory cell array.
Figure 6:
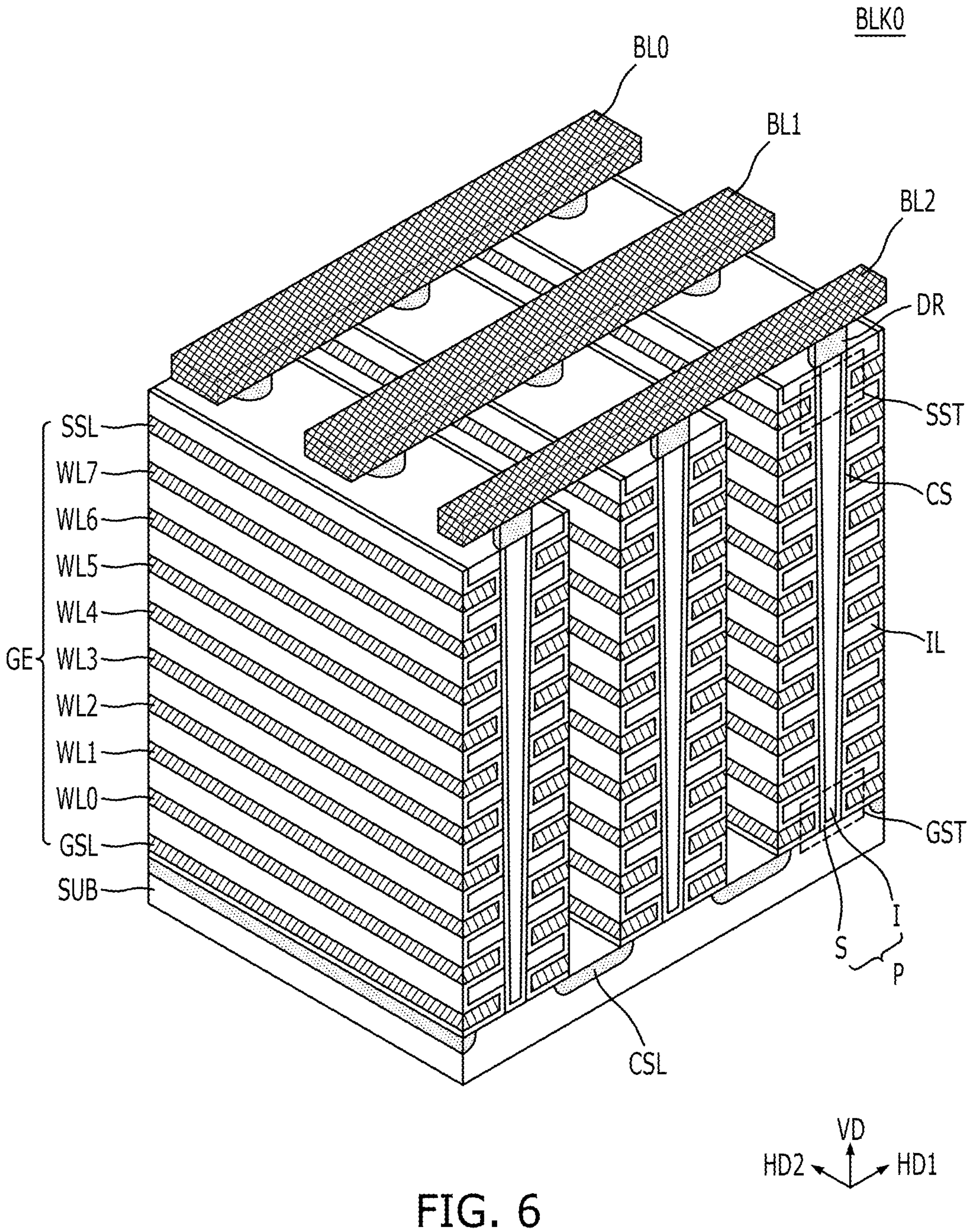
FIG. 6 is a perspective view illustrating an example of a structure of a block.

FIG. 4 is a schematic diagram illustrating an example of a structure of the memory device 120. FIG. 5 is a diagram illustrating an example of the memory cell array 121. FIG. 6 is a perspective view illustrating an example of a structure of a block BLK0. Although it is illustrated in FIG. 4 and described that the memory device 120 has a cell over periphery (COP) structure, this is only an example, and the present disclosure is not limited thereto. That is, the memory device 120 may be implemented in any structure.

Referring to FIG. 4, the memory device 120 may include a first semiconductor layer L1 and a second semiconductor layer L2, and the first semiconductor layer L1 may be stacked in a vertical direction VD with respect to the second semiconductor layer L2. Specifically, the second semiconductor layer L2 may be disposed below the first semiconductor layer L1 in the vertical direction VD, and accordingly, the second semiconductor layer L2 may be disposed close to the substrate.

The memory cell array (e.g., the memory cell array 121 of FIG. 1 or the memory cell array 310 of FIG. 3) may be formed on the first semiconductor layer L1, and peripheral circuits (e.g., the row decoder 340, the voltage generation unit 330, the control logic 320 of FIG. 3, etc.) may be formed on the second semiconductor layer L2. Accordingly, the memory device 120 may have a structure in which the memory cell array is disposed on an upper portion of the peripheral circuit, that is, a COP structure. The COP structure may effectively reduce the horizontal area and improve the integration density of the memory device 120.

The second semiconductor layer L2 may include a substrate. Transistors and metal patterns for wiring the transistors may be formed on the substrate, forming the peripheral circuit on the second semiconductor layer L2. After the peripheral circuit is formed on the second semiconductor layer L2, the first semiconductor layer L1 including the memory cell array may be formed, and metal patterns may be formed to electrically connect the word lines WL and the bit lines BL of the memory cell array with the peripheral circuit formed on the second semiconductor layer L2. For example, the bit lines BL may extend in a first horizontal direction HD1, and the word lines WL may extend in a second horizontal direction HD2.

Referring to FIG. 5, the memory cell array 121 may include the plurality of blocks BLK0, BLK1, . . . , BLKi, where i may be a positive integer. Each of the plurality of blocks BLK0, BLK1, . . . , BLKi may have a 3D structure (or vertical structure). Specifically, each of the plurality of blocks BLK0, BLK1, . . . , BLKi may include a plurality of cell strings extending in the vertical direction VD. In this case, the plurality of cell strings may be disposed to be spaced apart from each other by a predetermined distance along the first horizontal direction HD1 and/or the second horizontal direction HD2.

The plurality of blocks BLK0, BLK1, . . . , BLKi may be selected by a row decoder (e.g., the row decoder 340 of FIG. 3) of the memory device. For example, the row decoder may select a block corresponding to the block address from among the plurality of blocks BLK0, BLK1, . . . , BLKi. Although FIG. 5 illustrates that the plurality of blocks BLK0, BLK1, . . . , BLKi are arranged along the first horizontal direction HD1, this is for convenience of description, and the present disclosure is not limited thereto. The plurality of blocks BLK0, BLK1, . . . , BLKi may be arranged along the first horizontal direction HD1, the second horizontal direction HD2, and/or the vertical direction VD.

Referring to FIG. 6, the block BLK0 may be formed in a perpendicular direction to the substrate SUB (e.g., the vertical direction VD). The substrate SUB may have a first conductivity type (e.g., p-type), and a common source line CSL extending along the second horizontal direction HD2 and doped with impurities of the second conductivity type (e.g., n-type) may be provided on the substrate SUB. A plurality of insulating films IL extending along the second horizontal direction HD2 may be sequentially provided along the vertical direction VD on a region of the substrate SUB between two adjacent common source lines CSL. The plurality of insulating films IL may be spaced apart from each other by a predetermined distance along the vertical direction VD. For example, the plurality of insulating films IL may include an insulating material such as silicon oxide.

A plurality of pillars P, which are sequentially disposed along the first horizontal direction HD1 and formed through the plurality of insulating films IL along the vertical direction VD, may be provided on a region of the substrate SUB between two adjacent common source lines CSL. For example, the plurality of pillars P may be formed through the plurality of insulating films IL to be in contact with the substrate SUB. Specifically, a surface layer S of each pillar P may include a silicon material having the first conductivity type and may serve as a channel area. Meanwhile, an inner layer I of each pillar P may include an insulating material such as silicon oxide or an air gap.

A charge storage layer CS may be provided along exposed surfaces of the insulating film IL, the pillar P, and the substrate SUB in the region between two adjacent common source lines CSL. The charge storage layer CS may include a gate insulating layer (or tunneling insulating layer), a charge trap layer, and a blocking insulating layer. For example, the charge storage layer CS may have an oxide-nitride-oxide (ONO) structure. In addition, a gate electrode GE including selection lines GSL and SSL and word lines WL0 to WL7 may be provided on the exposed surface of the charge storage layer CS in the region between two adjacent common source lines CSL.

Drains or drain contacts DR may be provided on each pillar P. For example, the drains or drain contacts DR may include a silicon material doped with impurities having a second conductivity type. Bit lines BL0 to BL2 extending in the first horizontal direction HD1 and spaced apart by a predetermined distance along the second horizontal direction HD2 may be provided on the drains or the drain contacts DR.

Figure 7:
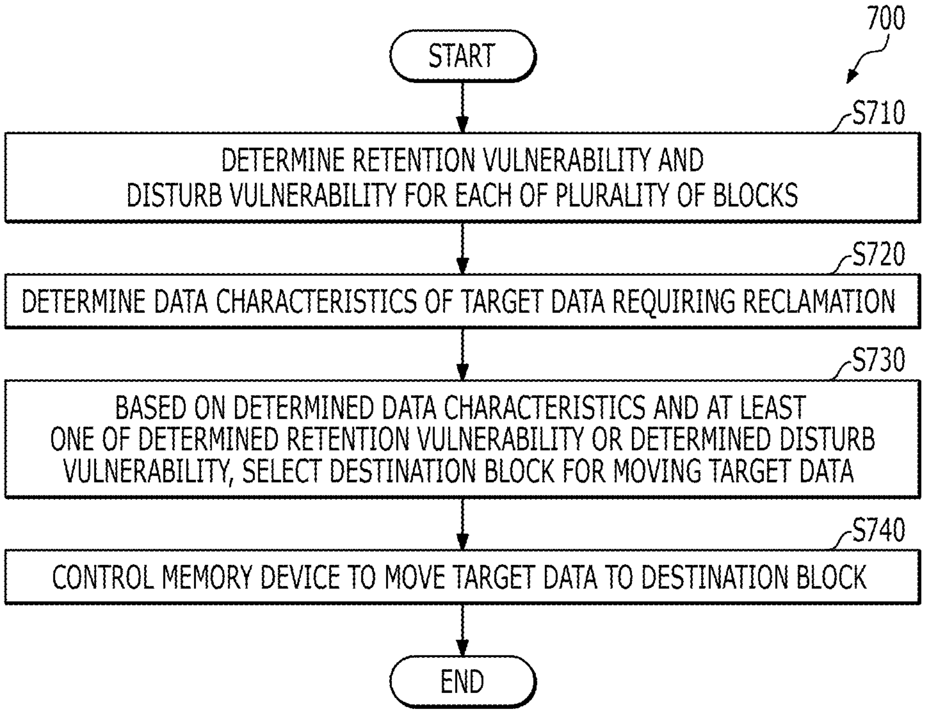
FIG. 7 is a flowchart of an example operating method of a memory controller.

FIG. 7 is a flowchart of an example operating method 700 of a memory controller. The method 700 may be performed by the memory controller (e.g., by at least one processor of the memory controller).

First, the memory controller may determine a retention vulnerability and a disturb vulnerability for each of the plurality of blocks included in the memory device, at S710.

Retention may refer to the ability to retain stored data without loss. The retention vulnerability may be a measure of how vulnerable a block is when it comes to retention. The memory controller may determine a high retention vulnerability for a block that has a low data retention and thus has a high likelihood of data loss as time passes after the data is stored. In addition, the memory controller may determine a low retention vulnerability for a block that has an excellent data retention and thus has a low likelihood of data loss as time passes after the data is stored.

A disturb phenomenon may refer to a phenomenon in which stored data is interfered with by the read, write or erase operations of adjacent areas (e.g., adjacent cells, adjacent pages, adjacent blocks, etc.), causing change and corruption to the original data. Disturb vulnerability may be a measure of the possibility that a block is affected by the (e.g., read, etc.) operation in the adjacent area and causes an error. The memory controller may determine a high disturb vulnerability for a block that is expected to have a high likelihood of data integrity being compromised due to the operation in the adjacent area. In addition, the memory controller may determine a low disturb vulnerability for a block that is expected to have a low likelihood of data integrity being compromised due to the operation in the adjacent area.

The retention vulnerability may be determined based on the degree of error occurrence during a predetermined period of time in each of the plurality of blocks. In addition, the disturb vulnerability may be determined based on the degree of error occurrence during the performance of a read operation according to a predetermined number of reads in each of the plurality of blocks. The error may refer to a phenomenon in which data is lost and/or corrupted, resulting in the data being altered from the initially stored information. A method of the memory controller for determining the retention vulnerability and the disturb vulnerability will be described in more detail below with reference to FIGS. 8 to 12.

The determined retention vulnerability and/or the determined disturb vulnerability may be used to select an appropriate destination block when performing or controlling the reclaim operation.

The memory controller may determine the data characteristics of the target data requiring reclamation, at S720. For example, in response to triggering reclamation for the target data, the memory controller may determine the data characteristics of the target data.

The memory controller may determine the target data as data requiring retention reinforcement or as data requiring disturb prevention, based on reclaim trigger factor for the target data. Additionally or alternatively, the memory controller may determine the expected read frequency of the target data based on the past read frequency of the target data. For example, the memory controller may determine the target data as hot data with a high expected read frequency or as cool data (i.e., cold data) with a low expected read frequency.

The memory controller may select a destination block for moving the target data, based on the determined data characteristics and at least one of the determined retention vulnerability or the determined disturb vulnerability, at S730. The memory controller may select an appropriate destination block that is suitable for the data characteristics of the target data. For example, the memory controller may select a block with a low disturb vulnerability as a destination block for moving the target data that is determined as the data requiring disturb prevention and/or the hot data. In addition, the memory controller may select a block with a low retention vulnerability as a destination block for moving the target data that is determined as the data requiring retention reinforcement and/or the cool data. Various aspects will be described in detail below with reference to FIGS. 13 to 17, in which the memory controller determines the data characteristics of the target data and selects a destination block for moving the target data.

The memory controller may control the memory device to move the target data to the destination block, at S740. For example, the memory controller may transmit, to the memory device, a command, an address, and/or a control signal for moving the target data to the destination block. The memory device may move the target data to the destination block based on the command, the address, and/or the control signal received from the memory controller.

As described above, an appropriate destination block suitable for the data characteristics of the target data requiring reclamation may be selected, and by performing the reclaim operation accordingly, the errors and/or the possibility of error occurrence in the memory device may be reduced and the reliability of the memory device may be improved. In addition, as the errors and/or the possibility of error occurrence are reduced, resources (e.g., power) required for various operations (e.g., reclaim, error correction, etc.) for maintaining the data integrity may be saved.

Figure 8:
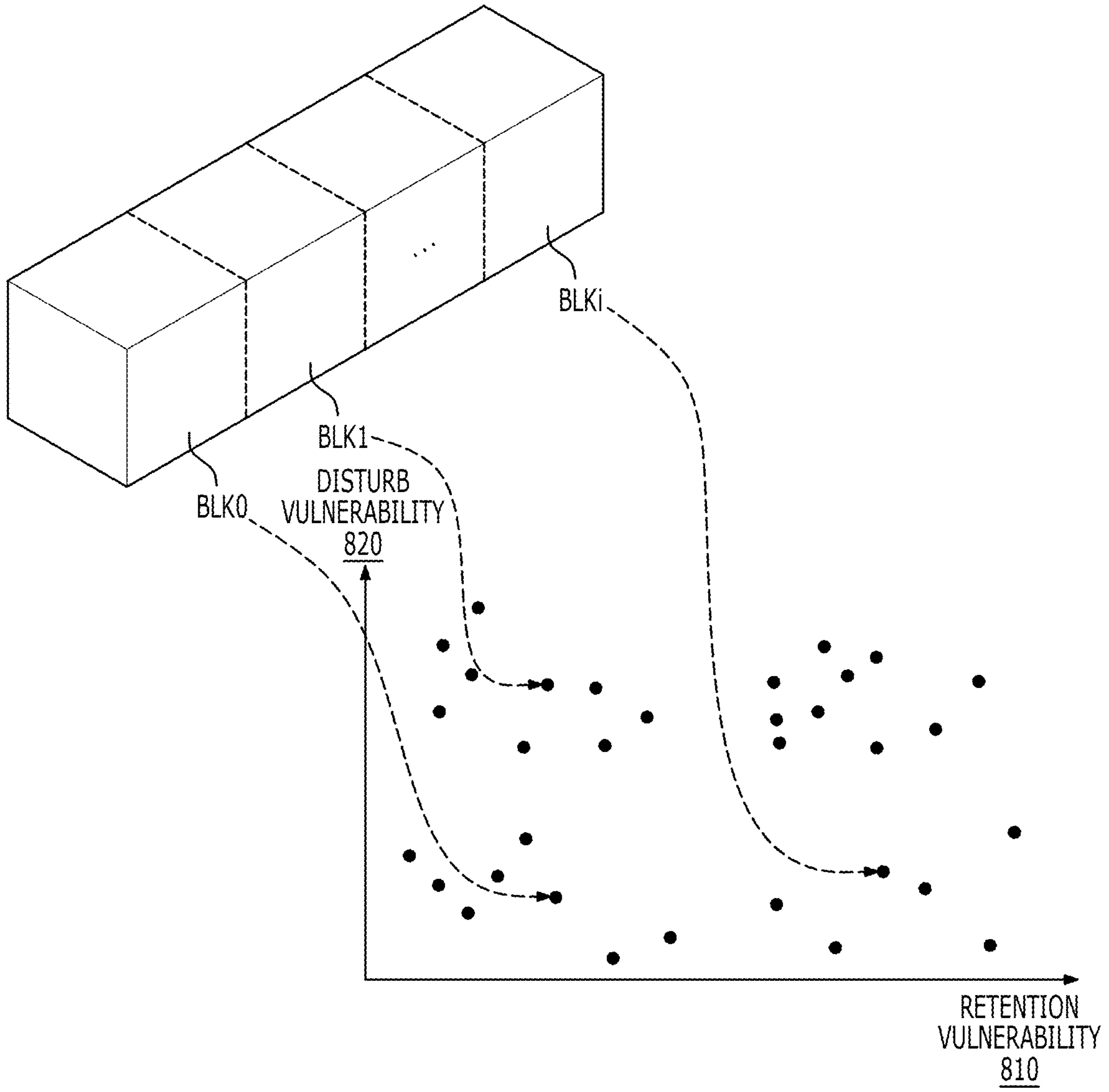
FIG. 8 is a diagram illustrating an example of determining a retention vulnerability and a disturb vulnerability for each of a plurality of blocks.

FIG. 8 is a diagram illustrating an example of determining a retention vulnerability 810 and a disturb vulnerability 820 for each of the plurality of blocks BLK0, BLK1, . . . , BLKi. Referring to FIG. 8, the memory controller may determine the retention vulnerability 810 and the disturb vulnerability 820 for each of the plurality of blocks BLK0, BLK1, . . . , BLKi (where 'i' is a positive integer) included in the memory device.

The memory controller may determine the retention vulnerability 810 and the disturb vulnerability 820 for each of the plurality of blocks BLK0, BLK1, . . . , BLKi based on the degree of error occurrence in each of the plurality of blocks BLK0, BLK1, . . . , BLKi. The degree of error occurrence may include information on extent of errors occurred in each of the plurality of blocks BLK0, BLK1, . . . , BLKi. For example, the degree of error occurrence may include information on the number of error bits and/or the level of errors (e.g., the number of operations required for error correction, etc.), etc. occurred in each of the plurality of blocks BLK0, BLK1, . . . , BLKi during a predetermined period of time or during the performance of a read operation according to a predetermined number of reads.

The memory controller may determine the retention vulnerability 810 for each of the plurality of blocks BLK0, BLK1, . . . , BLKi based on the degree of error occurrence during a predetermined period of time. For example, the memory controller may determine a higher retention vulnerability 810 for the blocks with a higher degree of error occurrence during a predetermined period of time and may determine a lower retention vulnerability 810 for the blocks with a lower degree of error occurrence during a predetermined period of time. In addition, the memory controller may determine the disturb vulnerability 820 for each of the plurality of blocks BLK0, BLK1, . . . , BLKi based on the degree of error occurrence during the performance of a read operation according to a predetermined number of reads in each of the plurality of blocks BLK0, BLK1, . . . , BLKi. For example, the memory controller may determine a higher disturb vulnerability 820 for the blocks with a higher degree of error occurrence during the performance of a read operation according to a predetermined number of reads, and determine a lower disturb vulnerability 820 for the blocks with a lower degree of error occurrence during the performance of a read operation according to a predetermined number of reads.

The memory controller may determine the retention vulnerability 810 and the disturb vulnerability 820 for each of the plurality of blocks BLK0, BLK1, . . . , BLKi based on test results for the memory device. For example, a test on the memory device may be performed during a manufacturing process (e.g., a post-process process). Through the test on the memory device, the degree of error occurrence during a predetermined period of time or during the performance of a read operation according to a predetermined number of reads in each of the plurality of blocks BLK0, BLK1, . . . , BLKi included in the memory device may be evaluated. The memory controller may determine the retention vulnerability 810 and the disturb vulnerability 820 for each of the plurality of blocks BLK0, BLK1, . . . , BLKi based on the test results.

The memory controller may dynamically determine or adjust the retention vulnerability 810 and/or the disturb vulnerability 820 for each of the plurality of blocks BLK0, BLK1, . . . , BLKi. For example, the memory controller may determine the retention vulnerability 810 and the disturb vulnerability 820 for each of the plurality of blocks BLK0, BLK1, . . . , BLKi based on the test results. The memory controller may adjust the retention vulnerability 810 and/or the disturb vulnerability 820 for each of the plurality of blocks BLK0, BLK1, . . . , BLKi based on the degree of error occurrence during use of the memory device.

Additionally or alternatively, the memory controller may dynamically determine the retention vulnerability 810 and/or the disturb vulnerability 820 for each of the plurality of blocks BLK0, BLK1, . . . , BLKi based on environmental conditions. For example, the test result may include a test result for the memory device under various environmental conditions (e.g., various temperature conditions, various power level conditions, etc.). The memory controller may dynamically determine the retention vulnerability 810 and/or the disturb vulnerability 820 based on the current environmental conditions (e.g., current temperature, current power level, etc.) associated with the memory device.

The retention vulnerability 810 and the disturb vulnerability 820 determined for each of the plurality of blocks BLK0, BLK1, . . . , BLKi may be stored in a storage circuit in the memory system and may be used later to control the reclaim operation by the memory controller.

FIGS. 9 to 12 are diagrams illustrating an example of classifying a plurality of blocks into a plurality of groups. The memory controller may classify a plurality of blocks into a plurality of groups based on the retention vulnerability 810 and/or the disturb vulnerability 820 determined for each of the plurality of blocks.

Figure 9:
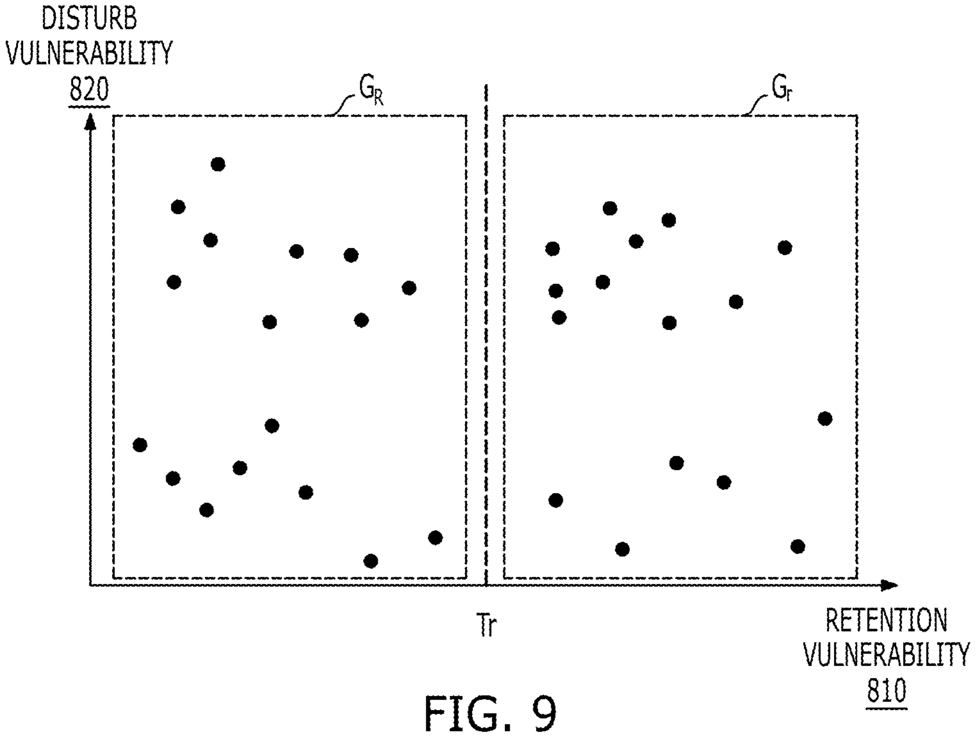
FIGS. 9 to 12 are diagrams illustrating an example of classifying a plurality of blocks into a plurality of groups.

For example, as illustrated in FIG. 9, the memory controller may classify the plurality of blocks into a retention strong group $G_R$ or a retention vulnerable group $G_r$ based on the retention vulnerability 810. For example, the memory controller may classify the blocks having the retention vulnerability 810 lower than a first reference vulnerability Tr into the retention strong group $G_R$, and classify the blocks having the retention vulnerability 810 higher than the first reference vulnerability Tr into the retention vulnerable group $G_r$. The first reference vulnerability Tr may be determined and/or adjusted based on the distribution of the retention vulnerabilities 810 of the blocks included in the memory device, the characteristics of the memory device, the use of the memory device, etc.

Figure 10:
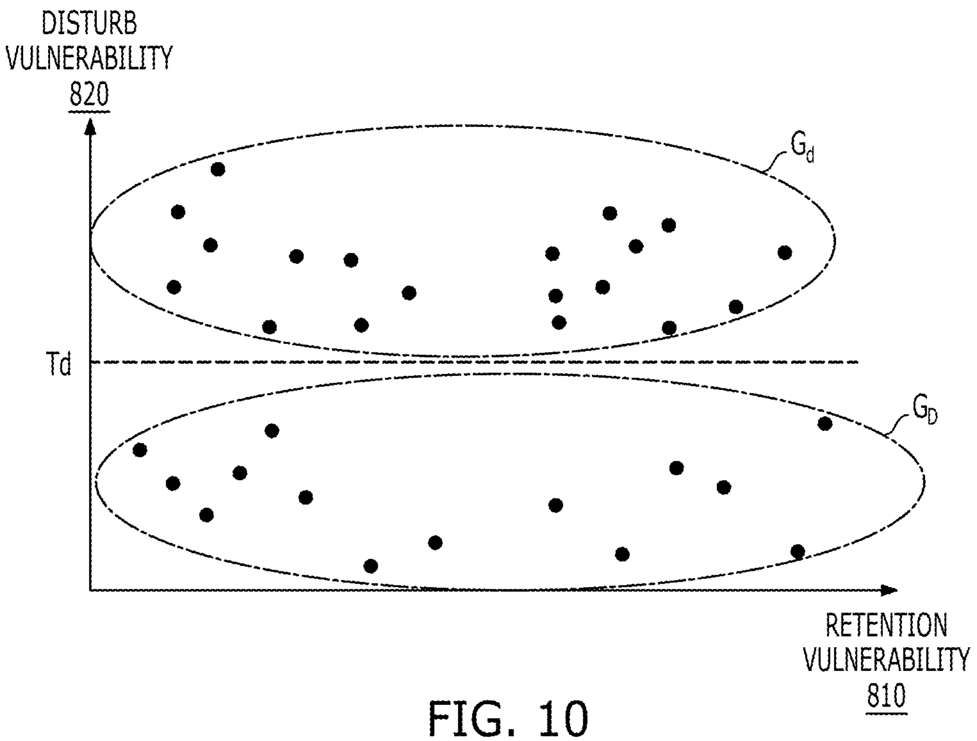

Additionally or alternatively, as illustrated in FIG. 10, the memory controller may classify the plurality of blocks into a disturb strong group $G_D$ or a disturb vulnerable group $G_d$ based on the disturb vulnerability 820. For example, the memory controller may classify the blocks having the disturb vulnerability 820 lower than a second reference vulnerability Td into the disturb strong group $G_D$, and may classify the blocks having the disturb vulnerability 820 higher than the second reference vulnerability Td into the disturb vulnerable group $G_d$. The second reference vulnerability Td may be determined and/or adjusted based on the distribution of the disturb vulnerabilities 820 of the blocks included in the memory device, the characteristics of the memory device, the use of the memory device, etc.

Figure 11:
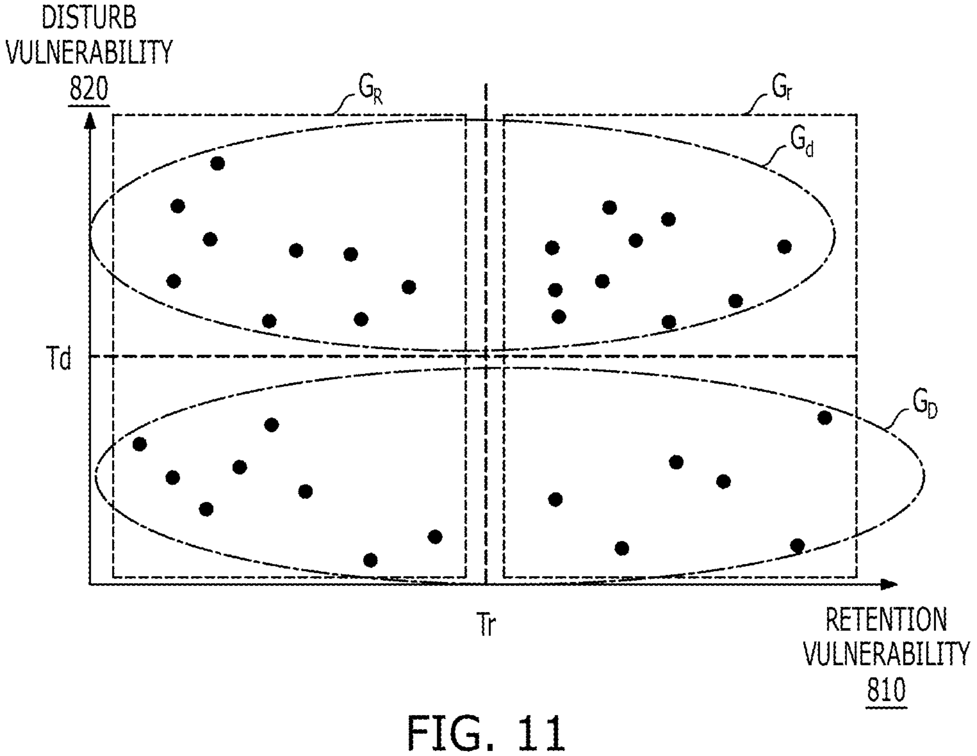

Additionally or alternatively, as illustrated in FIG. 11, the memory controller may classify the plurality of blocks in an overlapping manner based on the retention vulnerability 810 and the disturb vulnerability 820. For example, the memory controller may classify the blocks having the retention vulnerability 810 lower than the first reference vulnerability Tr into the retention strong group $G_R$, classify the blocks having the retention vulnerability 810 higher than the first reference vulnerability Tr into the retention vulnerable group $G_r$, classify the blocks having the disturb vulnerability 820 lower than the second reference vulnerability Td into the disturb strong group $G_D$, and classify the blocks having the disturb vulnerability 820 higher than the second reference vulnerability Td into the disturb vulnerable group $G_d$. Each of the plurality of blocks included in the memory device may belong to the retention strong group $G_R$ or the retention vulnerable group $G_r$, and may also belong to the disturb strong group $G_D$ or the disturb vulnerable group $G_d$.

Figure 12:
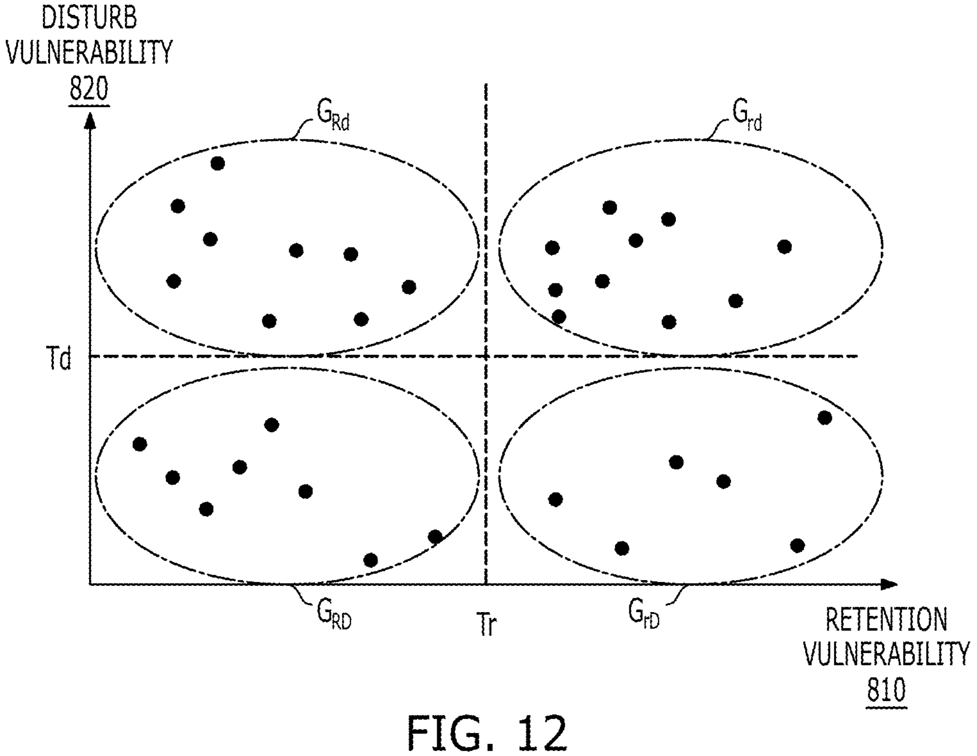

Additionally or alternatively, as illustrated in FIG. 12, the memory controller may classify the plurality of blocks in an exclusive manner based on the retention vulnerability 810 and the disturb vulnerability 820. For example, the memory controller may classify the blocks having the retention vulnerability 810 lower than the first reference vulnerability Tr and having the disturb vulnerability 820 lower than the second reference vulnerability Td into a retention strong and disturb strong group $G_{RD}$. In addition, the memory controller may classify the blocks having the retention vulnerability 810 higher than the first reference vulnerability Tr and the disturb vulnerability 820 lower than the second reference vulnerability Td into a retention vulnerable and disturb strong group $G_{rD}$. In addition, the memory controller may classify the blocks having the retention vulnerability 810 lower than the first reference vulnerability Tr and having the disturb vulnerability 820 higher than the second reference vulnerability Td into a retention strong and disturb vulnerable group $G_{Rd}$. In addition, the memory controller may classify the blocks having the retention vulnerability 810 higher than the first reference vulnerability Tr and having the disturb vulnerability 820 higher than the second reference vulnerability Td into a retention vulnerable and disturb vulnerable group $G_{rd}$. Each of the plurality of blocks included in the memory device may belong to any one of the retention strong and the disturb strong group $G_{RD}$, the retention vulnerable and disturb strong group $G_{rD}$, the retention strong and the disturb vulnerable group $G_{Rd}$, or the retention vulnerable and disturb vulnerable group $G_{rd}$.

The memory controller may classify the plurality of blocks into a plurality of groups using various grouping methods including the aspects described above with reference to FIGS. 9 to 12. Information on the classified group may be stored in a storage circuit in the memory system, and used later to control the reclaim operation by the memory controller.

In FIGS. 9 to 12, each of the plurality of blocks is classified into strong or vulnerable group according to whether the vulnerability corresponding to each of the plurality of blocks is greater or less than the first reference vulnerability Tr or the second reference vulnerability Td, but the present disclosure is not limited thereto, and in some embodiments, a group including a value of the first reference vulnerability Tr or the second reference vulnerability Td may be set into a strong or vulnerable group.

Figure 13:
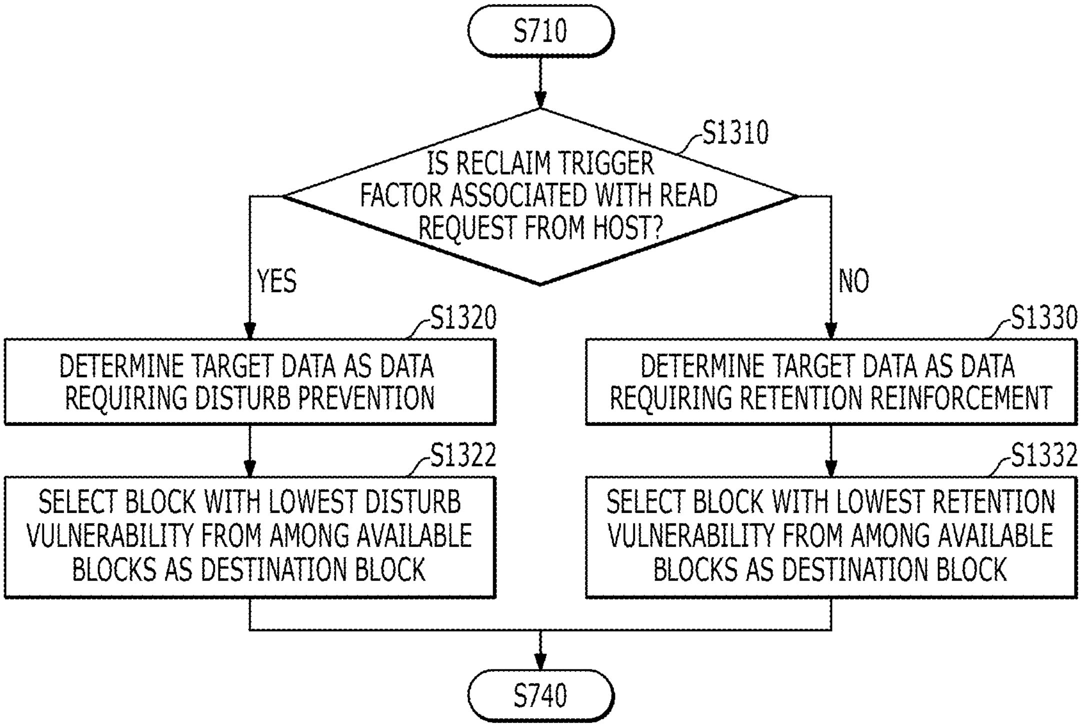
FIGS. 13 and 14 are flowcharts of an example method of determining data characteristics of target data based on a reclaim trigger factor and selecting a destination block.
Figure 14:
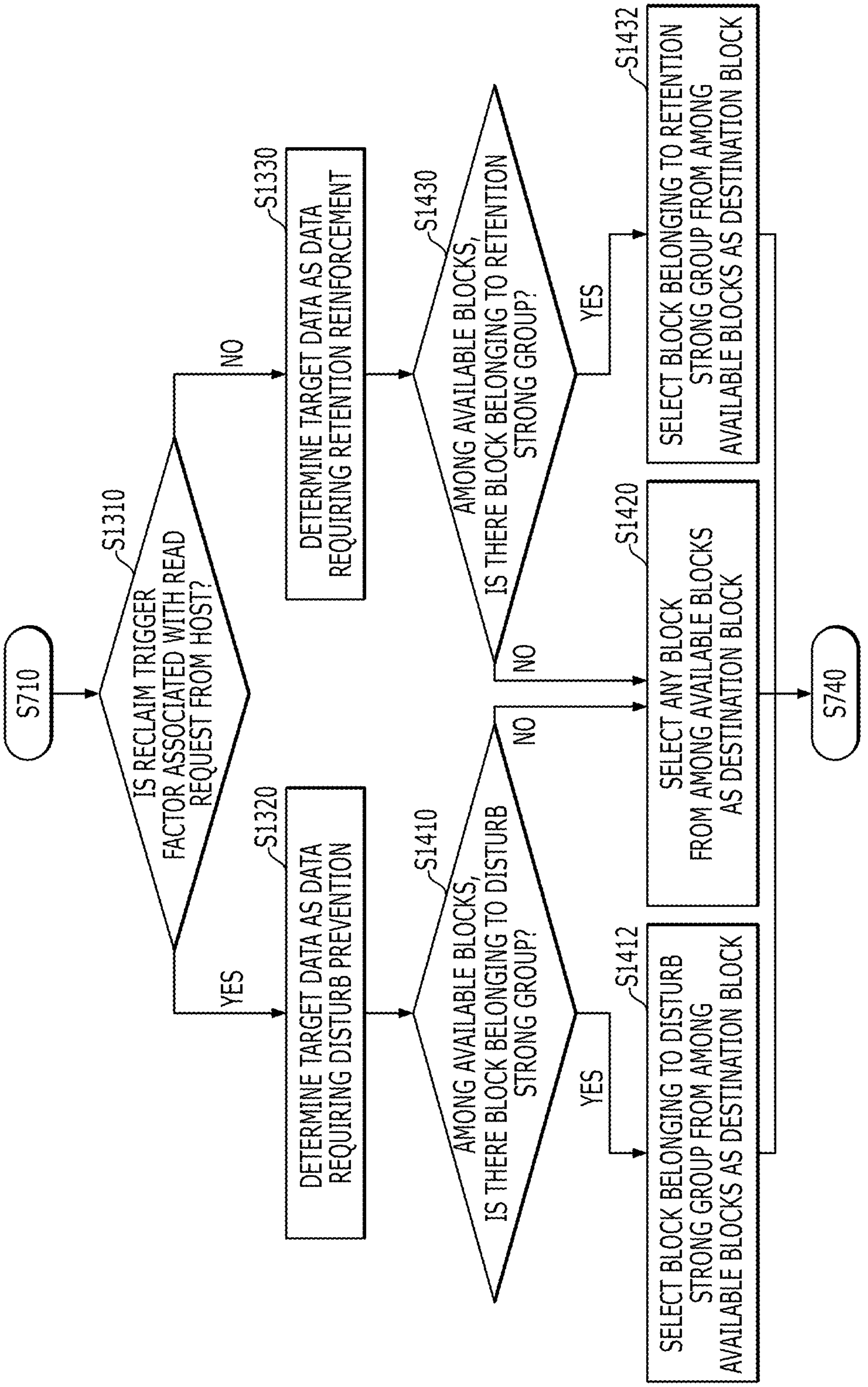

FIGS. 13 and 14 are flowcharts of an example method of determining data characteristics of target data based on a reclaim trigger factor and selecting a destination block. Referring to FIGS. 13 and 14, the memory controller may determine the data characteristics of the target data based on a reclaim trigger factor of the target data requiring reclamation and select a destination block.

For example, in response to triggering reclamation for the target data, the memory controller may determine whether the reclaim trigger factor for the target data is associated with a read request from the host, at S1310. As an example, if reclamation is triggered according to a monitoring operation (e.g., an operation based on the RINC algorithm, etc.) activated based on the read request from the host, the memory controller may determine that the reclaim trigger factor is associated with the read request from the host. On the other hand, if the reclamation is triggered according to a monitoring operation (e.g., a Patrol Read, a Background Media Scan, etc.) unrelated to the read request from the host, the memory controller may determine that the reclaim trigger factor is not related to the read request from the host.

If it is determined that the reclaim trigger factor is associated with the read request from the host, the memory controller may determine the target data as the data requiring disturb prevention, at S1320. Alternatively, if it is determined that the reclaim trigger factor is not associated with the read request from the host, the memory controller may determine the target data as data requiring retention reinforcement, at S1330.

The memory controller may select a block with a low disturb vulnerability as the destination block if it is determined that the target data is the data requiring disturb prevention, and may select a block with a low retention vulnerability as the destination block if it is determined that the target data is the data requiring retention reinforcement.

For example, as illustrated in FIG. 13, if it is determined that the target data is the data requiring disturb prevention, the memory controller may select at least one block with the lowest disturb vulnerability from among the available blocks as the destination block, at S1322. Alternatively, if it is determined that the target data is the data requiring retention reinforcement, the memory controller may select at least one block with the lowest retention vulnerability from among the available blocks as the destination block, at S1332.

As another example, as illustrated in FIG. 14, if it is determined that the target data is the data requiring disturb prevention, the memory controller may determine whether there is a block that belongs to the disturb strong group (e.g., $G_D$ in FIGS. 10 and 11, and $G_{RD}$ or $G_{rD}$ in FIG. 12) among the available blocks, at S1410. If there is a block that belongs to the disturb strong group among the available blocks, the memory controller may select at least one block belonging to the disturb strong group from among the available blocks as the destination block, at S1412. If there is no block belonging to the disturb strong group among the available blocks, the memory controller may select any block from among the available blocks as the destination block, at S1420. Additionally or alternatively, if there is no block belonging to the disturb strong group among the available blocks, the memory controller may select at least one block with the lowest disturb vulnerability from among the available blocks not belonging to the disturb strong group as the destination block.

Alternatively, if it is determined that the target data is the data requiring retention reinforcement, the memory controller may determine whether there is a block belonging to the retention strong group (e.g., $G_R$ in FIGS. 9 and 11, and $G_{Rd}$ or $G_{RD}$ in FIG. 12) among the available blocks, at S1430. If there is a block belonging to the retention strong group among the available blocks, the memory controller may select at least one block belonging to the retention strong group from among the available blocks as the destination block, at S1432. If there is no block belonging to the retention strong group among the available blocks, the memory controller may select any block from among the available blocks as the destination block, at S1420. Additionally or alternatively, if there is no block belonging to the retention strong group among the available blocks, the memory controller may select at least one block with the lowest retention vulnerability from among the available blocks not belonging to the retention strong group as the destination block.

The memory controller may control the memory device to move the target data to the destination block, at S740.

Figure 15:
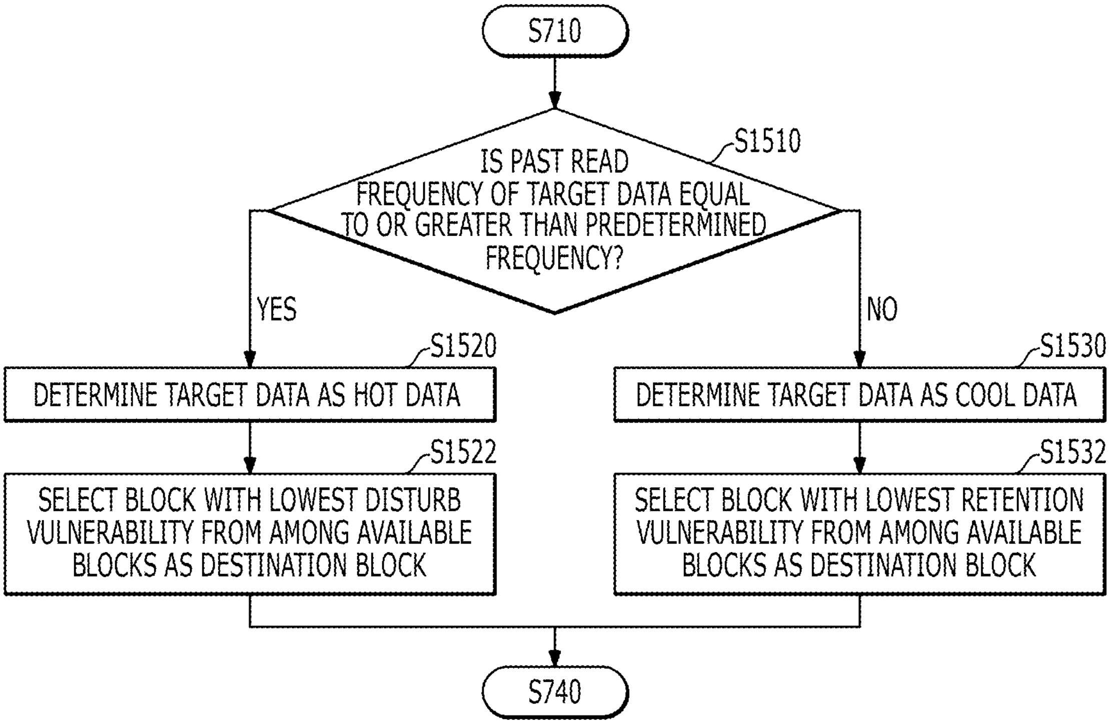
FIGS. 15 and 16 are flowcharts of an example method of determining data characteristics of target data based on a past read frequency of the target data and selecting a destination block.
Figure 16:
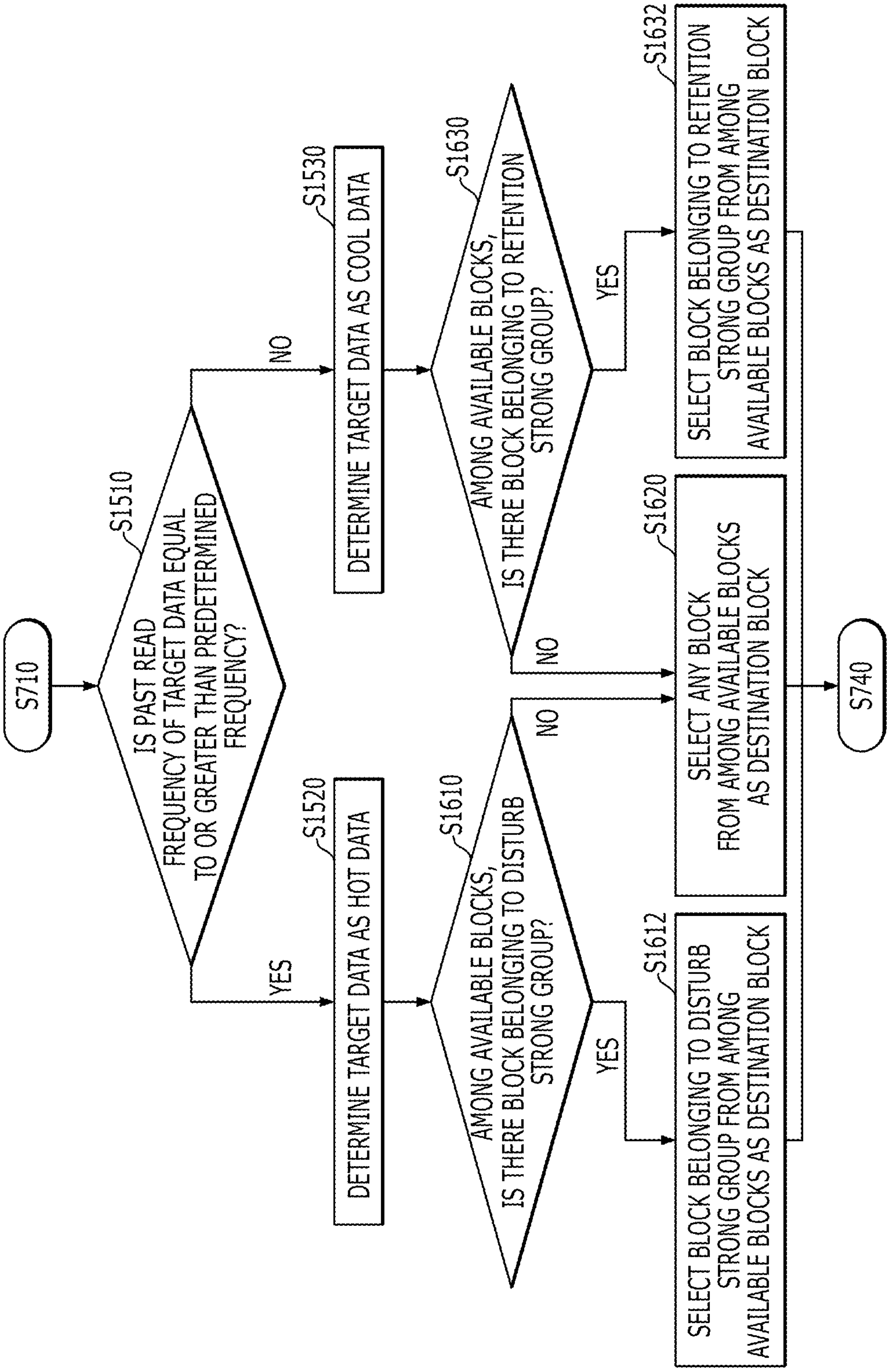

FIGS. 15 and 16 are flowcharts of an example method of determining data characteristics of target data based on a past read frequency of the target data and selecting a destination block. Referring to FIGS. 15 and 16, the memory controller may determine the data characteristics of the target data based on a past read frequency of the target data requiring reclamation and select a destination block.

For example, based on the past read frequency of the target data, the memory controller may determine the target data as hot data with a high expected read frequency or as cool data (i.e., cold data) with a low expected read frequency. The past read frequency may be the total number of reads for the target data or the number of reads for the target data during a recent predetermined period of time. To this end, the number of reads for the data stored in the memory device may be managed. For example, the number of reads for the data stored in the memory device may be stored in any storage circuit in the memory system, and/or may be updated.

Specifically, in response to triggering reclamation for the target data, the memory controller may determine whether the past read frequency of the target data is equal to or greater than a predetermined frequency, at S1510. If it is determined that the past read frequency of the target data is equal to or greater than a predetermined frequency, the memory controller may determine the target data as hot data having a high expected read frequency, at S1520. Alternatively, if it is determined that the past read frequency of the target data is less than the predetermined frequency, the memory controller may determine the target data as cool data having a low expected read frequency, at S1530. In FIGS. 15 and 16, whether the target data is hot data or cool data is determined based on whether it is equal to or greater than the predetermined frequency (i.e., a predetermined read frequency), but the present disclosure is not limited thereto. For example, in some embodiments, it may be determined whether the target data is the hot data or the cool data using other appropriate criteria for determining the expected read frequency, such as whether the past read frequency exceeds a predetermined frequency.

The memory controller may select a block with a low disturb vulnerability as the destination block if it is determined that the target data is the hot data with a high expected read frequency, and may select a block with a low retention vulnerability as the destination block if it is determined that the target data is the cool data with a low expected read frequency.

For example, as illustrated in FIG. 15, if it is determined that the target data is the hot data, the memory controller may select at least one block with the lowest disturb vulnerability from among the available blocks as the destination block, at S1522. Alternatively, if it is determined that the target data is the cool data, the memory controller may select at least one block with the lowest retention vulnerability from among the available blocks as the destination block, at S1532.

In another example, as illustrated in FIG. 16, if it is determined that the target data is the hot data, the memory controller may determine whether there is a block belonging to the disturb strong group (e.g., $G_D$ in FIGS. 10 and 11, and $G_{RD}$ or $G_{rD}$ in FIG. 12) among the available blocks, at S1610. If there is a block belonging to the disturb strong group among the available blocks, the memory controller may select at least one block belonging to the disturb strong group from among the available blocks as the destination block, at S1612. If there is no block belonging to the disturb strong group among the available blocks, the memory controller may select any block from among the available blocks as the destination block, at S1620. Additionally or alternatively, if there is no block belonging to the disturb strong group among the available blocks, the memory controller may select at least one block with the lowest disturb vulnerability from among the available blocks not belonging to the disturb strong group as the destination block.

Alternatively, if it is determined that the target data is the cool data, the memory controller may determine whether there is a block belonging to the retention strong group (e.g., $G_R$ in FIGS. 9 and 11, and $G_{Rd}$ or $G_{RD}$ in FIG. 12) among the available blocks, at S1630. If there is a block belonging to the retention strong group among the available blocks, the memory controller may select at least one block belonging to the retention strong group from among the available blocks as the destination block, at S1632. If there is no block belonging to the retention strong group among the available blocks, the memory controller may select any block from among the available blocks as the destination block, at S1620. Additionally or alternatively, if there is no block belonging to the retention strong group among the available blocks, the memory controller may select at least one block with the lowest retention vulnerability from among the available blocks not belonging to the retention strong group as the destination block.

The memory controller may control the memory device to move the target data to the destination block, at S740.

Figure 17:
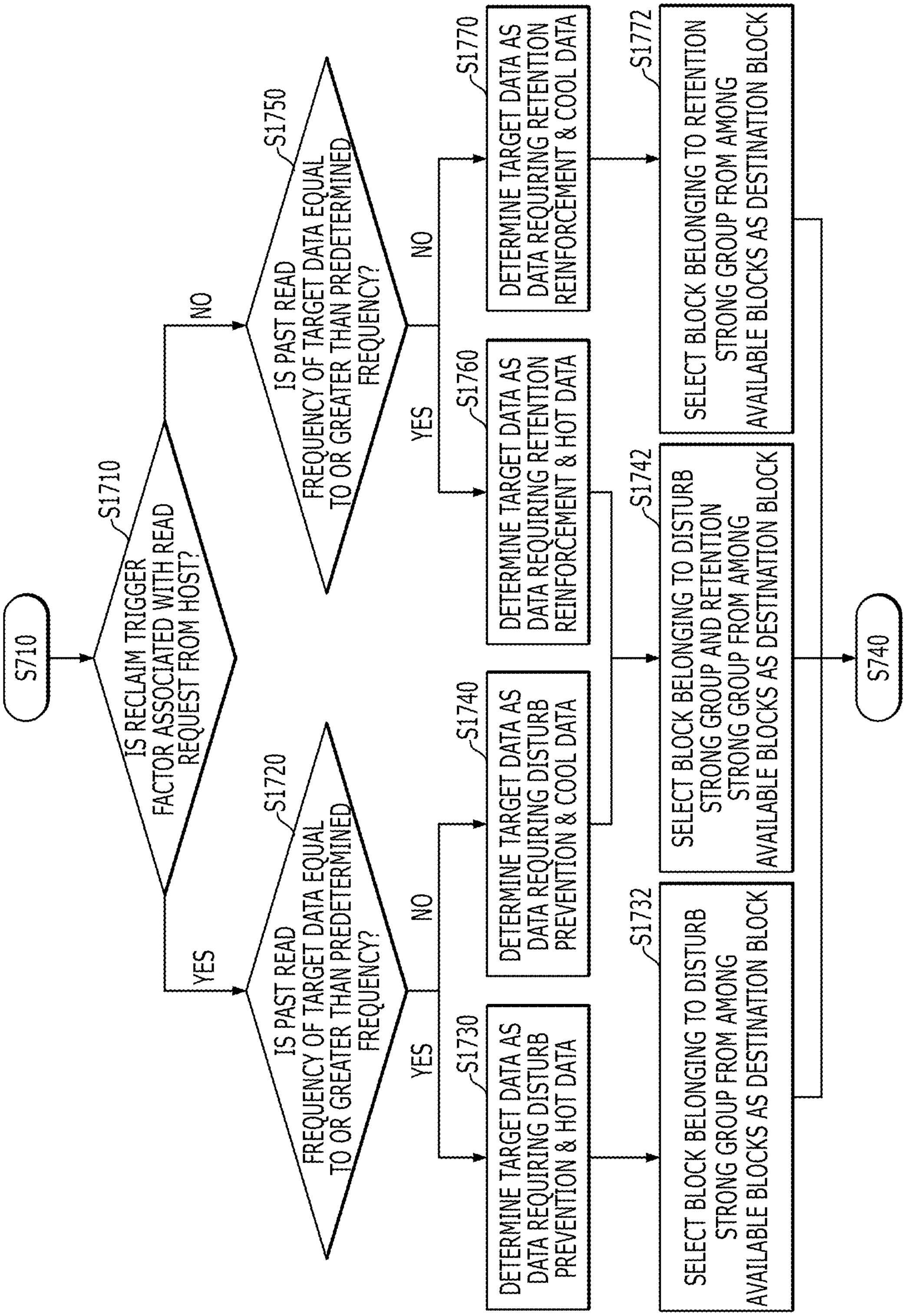
FIG. 17 is a flowchart of an example method of determining data characteristics of target data based on a reclaim trigger factor and a past read frequency of the target data, and selecting a destination block.

FIG. 17 is a flowchart of an example method of determining data characteristics of target data based on a reclaim trigger factor and a past read frequency of the target data, and selecting a destination block. Referring to FIG. 17, the memory controller may determine the data characteristics of the target data based on the reclaim trigger factor and the past read frequency of the target data and select a destination block.

For example, in response to triggering reclamation for the target data, the memory controller may determine whether the reclaim trigger factor for the target data is associated with the read request from the host, at S1710. In addition, the memory controller may determine whether the past read frequency of the target data is equal to or greater than a predetermined frequency, at S1720 and S1750. In S1720 and S1750 of FIG. 17, a criterion of whether the past read frequency is equal to or greater than the predetermined frequency (i.e., the predetermined read frequency) is applied, but the present disclosure is not limited thereto, and in some embodiments, other appropriate criteria for determining the expected read frequency may be applied, such as a criterion of whether the past read frequency exceeds a predetermined frequency.

If it is determined that the reclaim trigger factor is associated with the read request from the host and the past read frequency of the target data is equal to or greater than a predetermined frequency (i.e., if it is determined as YES in S1710 and YES in S1720), the memory controller may determine the target data as data requiring disturb prevention and as hot data, at S1730. If it is determined that the target data is data requiring disturb prevention and is hot data, the memory controller may select a block belonging to the disturb strong group (e.g., $G_D$ in FIGS. 10 and 11, and $G_{RD}$ or $G_{rD}$ in FIG. 12) from among the available blocks as the destination block, at S1732. In some embodiments, if there is no block belonging to the disturb strong group among the available blocks, the memory controller may select any block from among the available blocks as the destination block.

On the other hand, if it is determined that the reclaim trigger factor is associated with the read request from the host and the past read frequency of the target data is less than the predetermined frequency (i.e., if it is determined as YES in S1710 and NO in S1720), the memory controller may determine the target data as data requiring disturb prevention and as cool data, at S1740. If it is determined that the target data is the data requiring disturb prevention and is cool data, the memory controller may select a block belonging to the disturb strong and retention strong group (e.g., $G_{RD}$ in FIG. 12) from among the available blocks as the destination block, at S1742. In some embodiments, if there is no block belonging to the disturb strong and retention strong group among the available blocks, the memory controller may select a block belonging to the disturb strong group (e.g., $G_D$ in FIGS. 10 and 11 and $G_{rD}$ in FIG. 12) or a block belonging to the retention strong group (e.g., $G_R$ in FIGS. 9 and 11 and $G_{Rd}$ in FIG. 12) from among the available blocks as the destination block.

On the other hand, if it is determined that the reclaim trigger factor is not associated with the read request from the host and the past read frequency of the target data is equal to or greater than the predetermined frequency (i.e., if it is determined as NO in S1710 and YES in S1750), the memory controller may determine the target data as data requiring retention reinforcement and as hot data, at S1760. If it is determined that the target data is the data requiring retention reinforcement and is hot data, the memory controller may select a block belonging to the disturb strong and retention strong group (e.g., $G_{RD}$ in FIG. 12) from among the available blocks as the destination block, at S1742. In some embodiments, if there is no block belonging to the disturb strong and retention strong group among the available blocks, the memory controller may select a block belonging to the disturb strong group (e.g., $G_D$ in FIGS. 10 and 11 and $G_{rD}$ in FIG. 12) or a block belonging to the retention strong group (e.g., $G_R$ in FIGS. 9 and 11 and $G_{Rd}$ in FIG. 12) among the available blocks as the destination block.

On the other hand, if it is determined that the reclaim trigger factor is not associated with the read request from the host and the past read frequency of the target data is less than the predetermined frequency (i.e., if it is determined as NO in S1710 and determined as NO in S1750), the memory controller may determine the target data as data requiring retention reinforcement and as cool data, at S1770. If it is determined that the target data is data requiring retention reinforcement and is cool data, the memory controller may select a block belonging to the retention strong group (e.g., $G_R$ in FIGS. 9 and 11, and $G_{RD}$ or $G_{Rd}$ in FIG. 12) from among the available blocks as the destination block, at S1772. In some embodiments, if there is no block belonging to the retention strong group among the available blocks, the memory controller may select any block from among the available blocks as the destination block.

The memory controller may control the memory device to move the target data to the destination block, at S740.

The flowchart of FIGS. 7 and 13 to 17 and the above description are merely examples, and embodiments of the present disclosure may be implemented differently. For example, in some embodiments, the order of respective operations of the methods may be changed, some operations may be repeatedly performed, some may be added/changed/omitted, or some may be performed by other components.

Figure 18:
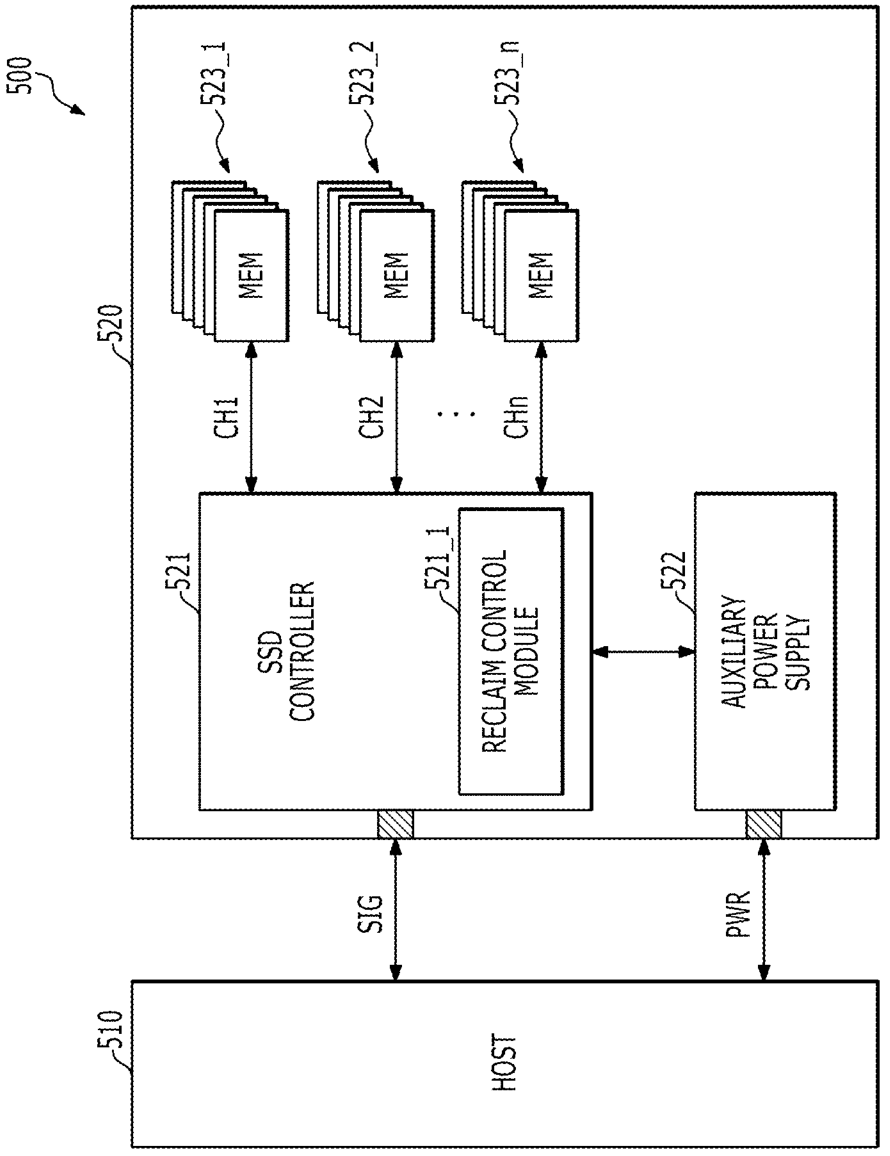
FIG. 18 is a block diagram illustrating an example of the memory system implemented for an SSD system.

FIG. 18 is a block diagram illustrating an example of the memory system implemented for an SSD system 500.

Referring to FIG. 18, the SSD system 500 may include a host 510 and an SSD 520. The SSD 520 may exchange signals SIG with the host 510 through a signal connector, and may receive power PWR through a power connector. The SSD 520 may include an SSD controller 521, an auxiliary power supply 522, and non-volatile memory devices 523_1, 523_2, . . . , **523_*n*. The non-volatile memory devices 523_1, 523_2, . . . , 523_*n* may include a NAND flash memory. The SSD controller 521 may correspond to the memory controller 110 of FIG. 1, and the non-volatile memory devices 523_1, 523_2, . . . , 523_*n* may correspond to the memory device 120 of FIG. 1. The SSD controller 521 may include a reclaim control module 521_1. The reclaim control module 521_1 may correspond to the reclaim control module 111 of FIG. 1. The SSD controller 521 may communicate with the non-volatile memory devices 523_1, 523_2, . . . , 523_*n* via channels CH1, CH2, . . . , CHn. The SSD 520 may be implemented based on the embodiments described above with reference to FIGS. 1 to 17**.

As used herein, the terms "comprises", "comprising", "includes", "including", "has", "having" and any other variations thereof specify the presence of the stated features, steps, operations, elements, components, and/or groups but do not preclude the presence or addition of one or more other features, steps, operations, elements, components, and/or groups thereof. In addition, it will be understood that, although the terms "first", "second", "third", etc. may be used herein to describe various elements, these elements should not be limited by these terms. Rather, these terms are only used to distinguish one element from another. For example, a first element could be termed a second element, and, similarly, a second element could be termed a first element, without departing from the scope of the present disclosure. Further, as used herein, the term "and/or" includes any and all combinations of one or more of the associated listed items.

Although the present disclosure has been described above by way of example embodiments and drawings, the present disclosure is not limited thereto, and it goes without saying that various changes and modifications can be made within the equivalent scope of the present disclosure and the claims to be described below by those of ordinary skill in the art.

The invention claimed is:

1. A memory system, comprising:

a non-volatile memory device comprising a memory cell array that includes a plurality of blocks; and a memory controller electrically connected to the non-volatile memory device and configured to control the non-volatile memory device, wherein the memory controller is configured to:

determine a retention vulnerability and a disturb vulnerability for each of the plurality of blocks;

classify each of the plurality of blocks into a retention strong group or a retention vulnerable group based on the retention vulnerability;

classify each of the plurality of blocks into a disturb strong group or a disturb vulnerable group based on the disturb vulnerability;

determine that target data is:

data requiring retention reinforcement in response to a reclaim trigger factor for the target data not being associated with a read request from a host; and data requiring disturb prevention in response to the reclaim trigger factor for the target data being associated with a read request from the host;

select a destination block for moving the target data from among available ones of the plurality of blocks, wherein:

in response to determining that the target data is the data requiring retention reinforcement, the destination block is a block belonging to the retention strong group; and in response to determining that the target data is the data requiring disturb prevention, the destination block is a block belonging to the disturb strong group; and control the non-volatile memory device to move the target data to the destination block.

2. The memory system according to claim 1, wherein the retention vulnerability is determined based on a degree of error occurrence in each of the plurality of blocks during a predetermined period of time.

3. The memory system according to claim 1, wherein the disturb vulnerability is determined based on a degree of error occurrence during a predetermined number of read operations performed on each of the plurality of blocks.

4. The memory system according to claim 1, wherein the memory controller is further configured to:

determine the retention vulnerability and the disturb vulnerability based on a test result for the non-volatile memory device; and adjust the retention vulnerability and the disturb vulnerability based on a degree of error occurrence during use of the non-volatile memory device.

5. The memory system according to claim 1, wherein the memory controller is further configured to determine at least one of the retention vulnerability or the disturb vulnerability based on a test result for the non-volatile memory device under a plurality of environmental conditions or a current environmental condition associated with the non-volatile memory device.

6. The memory system according to claim 1, wherein the memory controller is further configured to select at least one block with a lowest retention vulnerability from among available ones of the plurality of blocks as the destination block in response to determining that the target data is the data requiring retention reinforcement.

7. The memory system according to claim 1, wherein the memory controller is further configured to select at least one block with a lowest disturb vulnerability from among available ones of the plurality of blocks as the destination block in response to determining that the target data is the data requiring disturb prevention.

8. The memory system according to claim 1, wherein the memory controller is further configured to determine an expected read frequency of the target data based on a past read frequency of the target data.

9. The memory system according to claim 8, wherein the memory controller is further configured to:

determine that the target data is hot data with a high expected read frequency or is cold data with a low expected read frequency based on the past read frequency of the target data;

select a block with a lowest disturb vulnerability from among available ones of the plurality of blocks as the destination block in response to determining that the target data is the hot data; and select a block with a lowest retention vulnerability from among the available ones of the plurality of blocks as the destination block in response to determining that the target data is the cold data.

10. The memory system according to claim 8, wherein the memory controller is further configured to:

determine that the target data is hot data with a high expected read frequency or is cold data with a low expected read frequency based on the past read frequency of the target data;

select the block belonging to the disturb strong group as the destination block in response to determining that the target data is the hot data; and select the block belonging to the retention strong group as the destination block in response to determining that the target data is the cold data.

11. The memory system according to claim 1, wherein the memory controller is further configured to:

determine that the target data is hot data with a high expected read frequency or is cold data with a low expected read frequency based on a past read frequency of the target data; and select a block belonging to both the disturb strong group and the retention strong group from among available ones of the plurality of blocks as the destination block in response to determining that the target data is the data requiring retention reinforcement and is the hot data, or that the target data is the data requiring disturb prevention and is the cold data.

12. The memory system according to claim 1, wherein:

each of the plurality of blocks includes a plurality of memory cells, the non-volatile memory device is configured to store data of a predetermined number of bits in each of the plurality of memory cells, and the predetermined number of bits is at least 4 bits.

13. A memory controller configured to control a memory device including a plurality of blocks, the memory controller comprising:

a working memory configured to store one or more instructions; and at least one processor electrically connected to the working memory, wherein, in response to executing the one or more instructions stored in the working memory, the at least one processor is configured to control the memory device to:

determine a retention vulnerability and a disturb vulnerability for each of the plurality of blocks;

classify each of the plurality of blocks into a retention strong group or a retention vulnerable group based on the retention vulnerability;

classify each of the plurality of blocks into a disturb strong group or a disturb vulnerable group based on the disturb vulnerability;

determine that target data is:

data requiring retention reinforcement in response to a reclaim trigger factor for the target data not being associated with a read request from a host; and data requiring disturb prevention in response to the reclaim trigger factor for the target data being associated with a read request from the host;

select a destination block for moving the target data from among available ones of the plurality of blocks, wherein:

in response to determining that the target data is the data requiring retention reinforcement, the destination block is a block belonging to the retention strong group; and in response to determining that the target data is the data requiring disturb prevention, the destination block is a block belonging to the disturb strong group; and move the target data to the destination block.

14. An operating method of a memory controller configured to control a memory device including a plurality of blocks, the operating method comprising:

determining a retention vulnerability and a disturb vulnerability for each of the plurality of blocks;

classifying each of the plurality of blocks into a retention strong group or a retention vulnerable group based on the retention vulnerability;

classifying each of the plurality of blocks into a disturb strong group or a disturb vulnerable group based on the disturb vulnerability;

determining that target data is:

data requiring retention reinforcement in response to a reclaim trigger factor for the target data not being associated with a read request from a host; and data requiring disturb prevention in response to the reclaim trigger factor for the target data being associated with a read request from the host;

selecting a destination block for moving the target data from among available ones of the plurality of blocks, wherein:

in response to determining that the target data is the data requiring retention reinforcement, the destination block is a block belonging to the retention strong group; and in response to determining that the target data is the data requiring disturb prevention, the destination block is a block belonging to the disturb strong group; and controlling the memory device to move the target data to the destination block.

15. The method according to claim 14, further comprising:

determining that the target data is hot data with a high expected read frequency or is cold data with a low expected read frequency based on a past read frequency of the target data, and wherein the selecting of the destination block for moving the target data comprises selecting a block belonging to both the disturb strong group and the retention strong group from among available ones of the plurality of blocks as the destination block in response to determining that the target data is the data requiring retention reinforcement and is the hot data, or that the target data is the data requiring disturb prevention and is the cold data.

* * * * *